March 24, 1959 D. E. REED 2,879,480
FREQUENCY MODULATING TRANSISTOR CIRCUITS
Filed Nov. 4, 1954
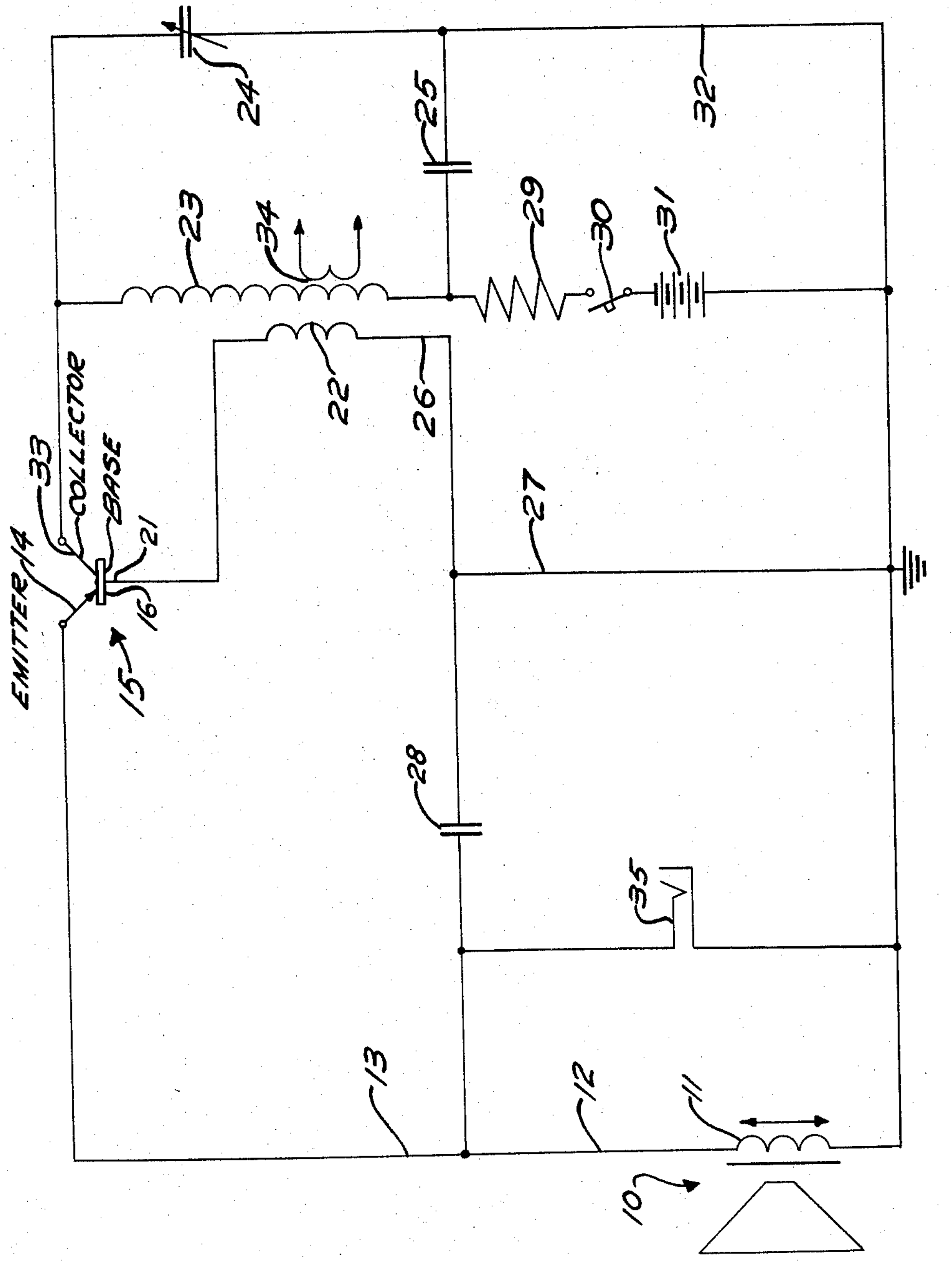
INVENTOR
D. E. REED
BY C. B. Hamilton
ATTORNEY United States Patent Office 2,879,480
Patented Mar. 24, 1959

2,879,480

FREQUENCY MODULATING TRANSISTOR CIRCUITS

Duke E. Reed, Riverside, Ill., assignor to Western Electric Company, Incorporated, New York, N.Y., a corporation of New York Application November 4, 1954, Serial No. 466,784

3 Claims. (Cl. 332—16)

This invention relates to frequency modulating transistor circuits, and has for an object thereof the provision of new and improved transistor circuits for frequency modulation.

A further object of the invention is to provide simple, inexpensive transistor circuits for frequency modulation.

A circuit illustrating certain features of the invention may include a transistor having a base, an emitter and a collector. A coil of a microphone is connected to the emitter and an inductive-capacitive network is connected to the collector. A feedback coil coupled to a coil of the network is connected to the base.

A complete understanding of the invention may be obtained from the following detailed description of a circuit forming a specific embodiment thereof, when read in conjunction with the appended drawing, in which the single figure is a diagrammatic view of a circuit forming one embodiment of the invention.

Referring now in detail to the drawing, there is shown therein a dynamic type microphone 10 which includes a coil 11 following, in voltage and frequency, the amplitude and frequency of sounds applied to the microphone. The coil 11 is grounded at one end and the other end thereof is connected by conductors 12 and 13 to an emitter 14 of a PNP transistor 15 of either the point contact type or the junction type having a semi-conducting body 16. A base electrode 21 of the transistor is connected to one end of a feedback coil 22 coupled to a coil 23 forming a resonant circuit with an adjustable capacitor 24 and a capacitor 25 large enough to bypass both audio frequency and radio frequency component. The other end of the coil 22 is connected by conductors 26 and 27 to ground, and a radio frequency bypass capacitor 28 is connected between the conductors 27 and 12. The capacitor 28 offers low impedance to radio frequency currents but is sufficiently small that it offers a substantial impedance to audio frequency. As a result, the emitter 14 is tied close to ground potential insofar as radio frequency oscillations are concerned but the potential of the emitter is varied by audio frequency oscillations from the coil 11.

A resistor 29 and a switch 30 connect ends of the capacitor 25 and the coil 23 to a battery 31, the other plate of the capacitor 25 and one plate of the capacitor 24 being grounded by a conductor 32. The other plate of the capacitor 24 and the other end of the coil 23 are connected to a collector 33 of the transistor. An output coil 34 is coupled to the coil 23, and a jack 35 is connected across the coil 11 to connect external modulation from a record player.

When the human voice or other noises enter the microphone 10, they cause the diaphragm thereof to be displaced, thus changing the reluctance of the magnetic path established by a permanent magnet through pole pieces and the coil 11 of the microphone. This changes the number of magnetic lines of force surrounding the coil and generates therein a small alternating current. This small current flows through the emitter 14 and the base 21 of the transistor 15, and by transistor action, effectively changes the collector-to-base impedance causing a change in frequency of the radio frequency oscillating circuit consisting essentially of the coils 23 and 22, capacitors 24 and 25, and the base 21 and collector 33 connections of the transistor. The emitter 14 is held at radio frequency ground potential by the capacitor 28 which acts as a bypass capacitor. The collector 33 is held at approximately ground insofar as audio frequency is concerned by the low inductance of the coil 23 and the high capacitance of the capacitor 25 but varies in potential in the radio frequency voltage oscillations.

Radio frequency oscillations are obtained by a property of transistors in which small signals in a low impedance base circuit are amplified in a suitable high impedance collector circuit. The coil 22 consists of relatively few turns and provides a suitable low base impedance. A tank circuit is formed by the capacitors 24 and 25 and the coil 23, which provides, at resonance, a suitable high impedance collector circuit. Turning on the battery by means of switch 30, causes a surge of current in the coil 23. The current surge flows through a circuit defined by battery 31, switch 30, resistor 29, coil 23, collector 33, transistor base 16, base lead 21, coil 22 and conductors 26 and 27 to ground. The surge of current in the coil 23 causes a built up flux in the coil 22 which opposes the flux tending to be set up by the current flowing through the coil 22 to ground, and therefore induces a reverse current flow in the base circuit through the transistor and coil 23. The reverse current flow makes the base 21 more negative relative to the potential of the emitter 14 to decrease the impedance of the transistor, thereby allowing the transistor to conduct from the emitter to the collector along the path of reverse current. The reverse current is opposed by the flux in the coil 23 and thereby a third current is made to flow in a direction of the original current and makes the base 21 become positive with respect to the emitter 14 and thereby causing the transistor to cease conducting and the cycle repeats itself to produce radio frequency oscillations. This "negative-resistance" property of the circuit causes sustained oscillations at resonance frequencies, subject to excursions above and below this frequency according to induced audio frequency currents on the emitter generated by the microphone 10.

The frequency modulated radio frequency energy in the coil 22 generates electromagnetic waves in the surrounding air (ether) which may be picked up without benefit of connecting wires by any AM or FM radio receiver capable of being tuned to the same frequency. Also, an output coil 34 coupled to the coil 23 may be connected to an antenna or an amplifier circuit, or omitted, as desired. In the case of AM receivers, best results are obtained by tuning the receiver to a point slightly off resonance, corresponding to a point about one-third the distance from the top of the selectivity curve of such receiver. Reception is then accomplished by what is commonly known as "slope detection" used by amateurs and others to receive narrow band frequency modulated signals in radio communication.

The above-described circuit may be modified to obtain increased center frequency stability by inserting a piezo electric crystal with a shunting resistance in series with the collector 33 and the coil 23. Also, the microphone may be shunted with a low impedance phonopickup at the jack 35 to play music into a radio without wires. While the above-described circuit is described as having a PNP junction or point contact type transistor, the circuit also is highly effective by substituting a NPN transistor and reversing the terminals of the battery 31. Except for the battery the NPN transistor would be connected into the circuit identically with the PNP transistor shown and described.

The above-described circuit forms a highly effective frequency modulating circuit while being simple and inexpensive in construction and operation.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A frequency modulation system comprising a transistor having a base, an emitter and a collector, a resonant circuit tuned to resonate at radio frequencies connected directly to the collector to provide a high impedance match, a low impedance feedback system connected to the base and inductively coupled to said resonant circuit for feeding back the portion of the radio frequency oscillations to said base a battery connected between the resonant circuit and the feedback system for causing a current flow through the collector and base circuits to produce radio frequency oscillations, a circuit connected to the emitter and electrically isolated from the radio frequency oscillations, and a transducer connected to the emitter circuit for supplying audio frequencies to the emitter to obtain a frequency modulated output.

2. A frequency modulation system comprising a transistor having a low impedance emitter, a low impedance base and a high impedance collector, a high impedance tuned circuit connected to and impedance matched with the collector comprising of an inductor and a capacitor connected in parallel and tuned to resonate at radio frequencies, a low impedance coil of relatively few turns connected to and impedance matched with the base, said low impedance coil being inductively coupled to said inductor to provide feedback of the collector currents to the base for producing radio frequency oscillations, a circuit connected to the emitter and electrically isolated from radio frequency oscillations, and a transducer connected in the emitter circuit for supplying audio frequency oscillations to the emitter lead to frequency modulate the radio signal with said audio signal.

3. In a frequency modulation system, a transistor having an emitter, a collector and a base, a high impedance coil connected to said collector, a circuit connected between said base and ground potential, a battery having a negative terminal connected to said high impedance coil and a positive terminal connected to ground whereby a first current flows through the collector and base, a low impedance coil connected in said base circuit and inductively coupled to the high impedance coil for inducing a second current in a direction opposite to said first current within the low impedance coil to obtain radio frequency oscillations, a variable capacitor connected across the high impedance coil for tuning the radio frequency oscillations, and a circuit connected between the emitter and ground for feeding audio frequency oscillations to said emitter to frequency modulate said radio frequency oscillations, said emitter circuit being electrically isolated from the radio frequency oscillations.

References Cited in the file of this patent

UNITED STATES PATENTS

| | | |
|---|---|---|
| 2,556,286 | Meacham | June 12, 1951 |
| 2,657,360 | Wallace | Oct. 27, 1953 |
| 2,745,012 | Felker | May 8, 1956 |
| 2,757,287 | Stanley | July 31, 1956 |